Nov. 7, 1961 R. J. HICKIN ET AL 3,007,376
METHOD OF JOINING PAPERBOARD ELEMENTS USING MORE THAN
ONE KIND OF ADHESIVE AND CARTON
SEALED BY SUCH METHOD
Filed July 30, 1958 3 Sheets-Sheet 1
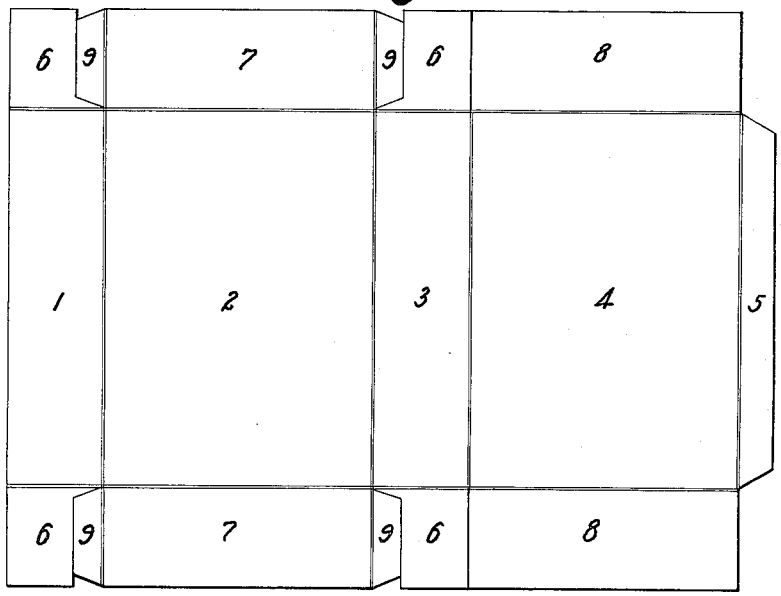
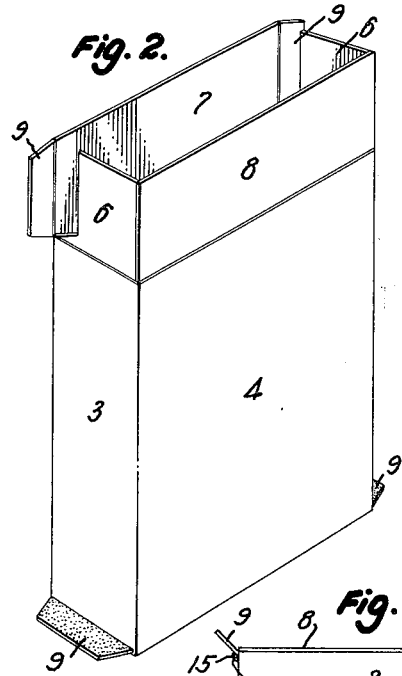
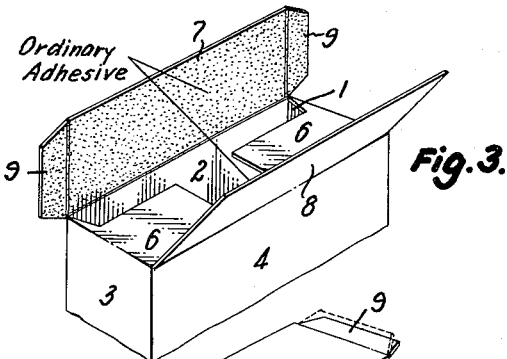
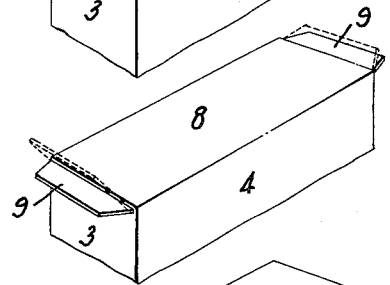
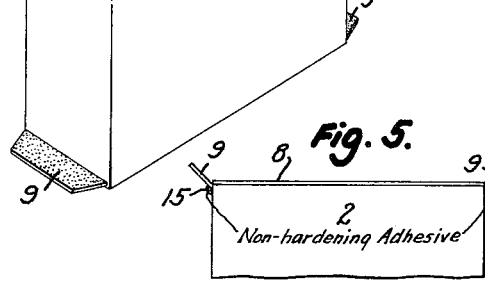
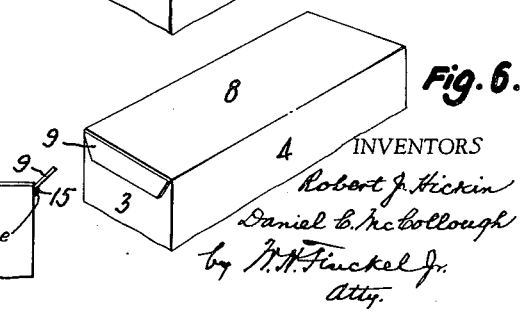
INVENTORS
Robert J. Hickin
Daniel E. McCollough
by W.H. Finckel Jr.
Atty.

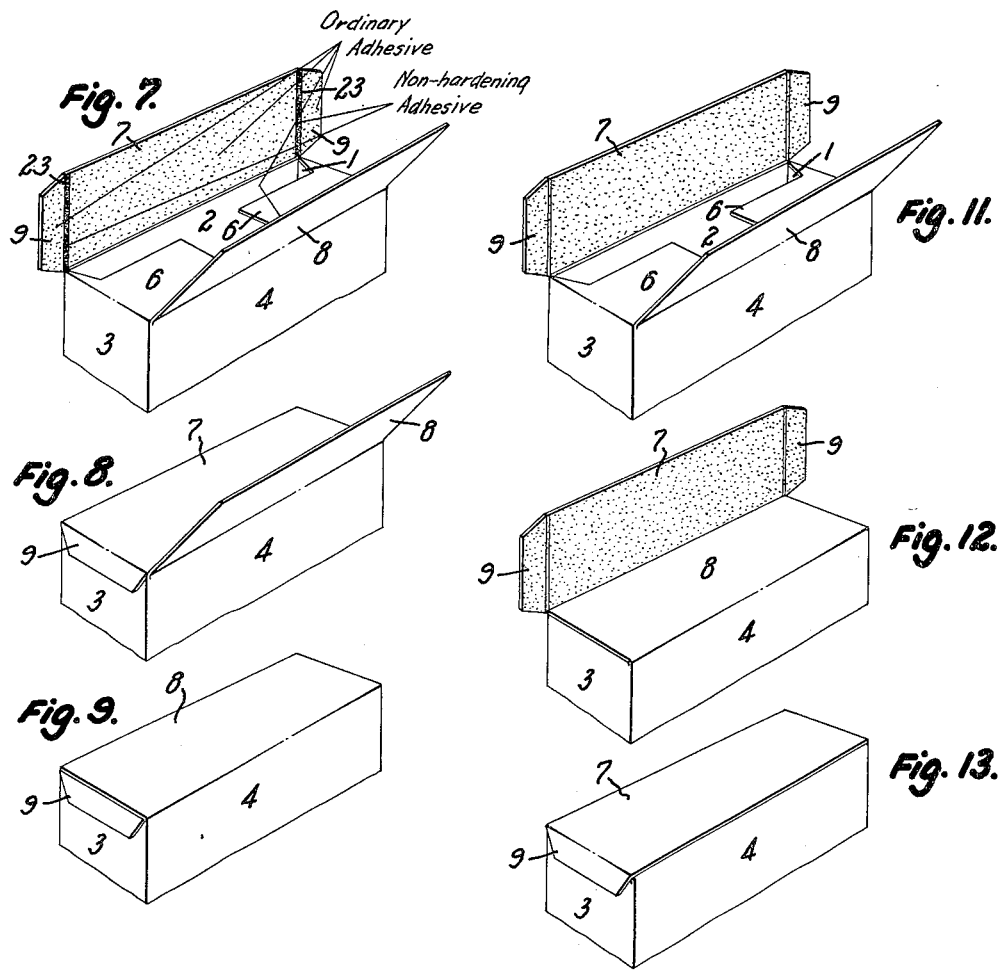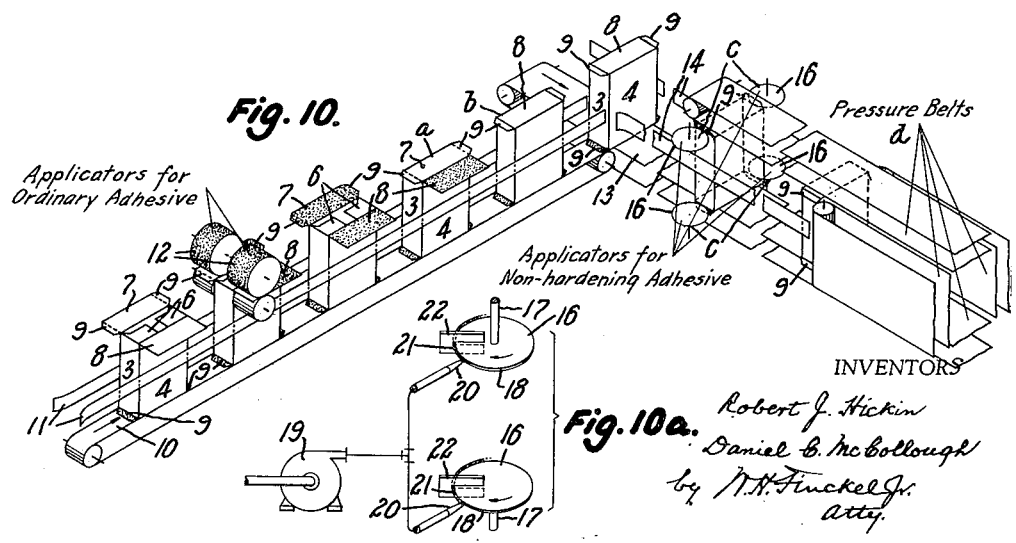

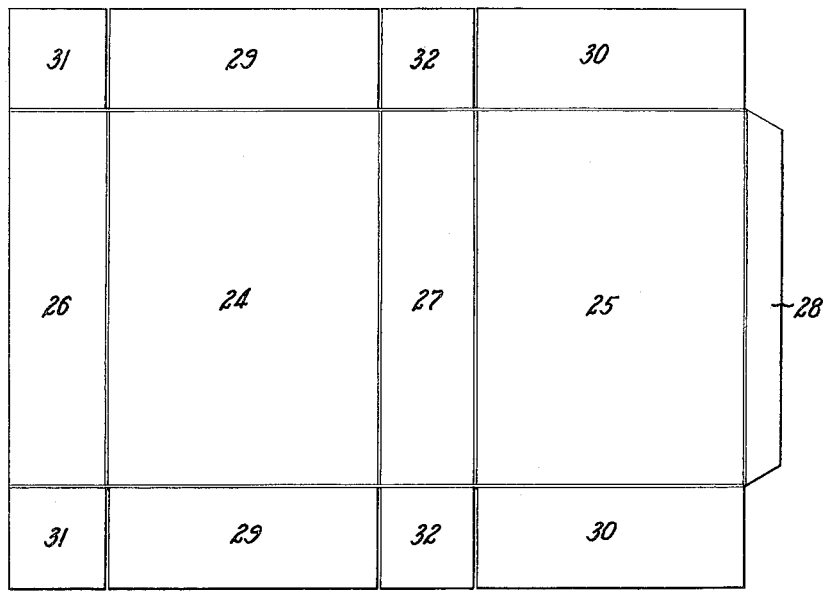
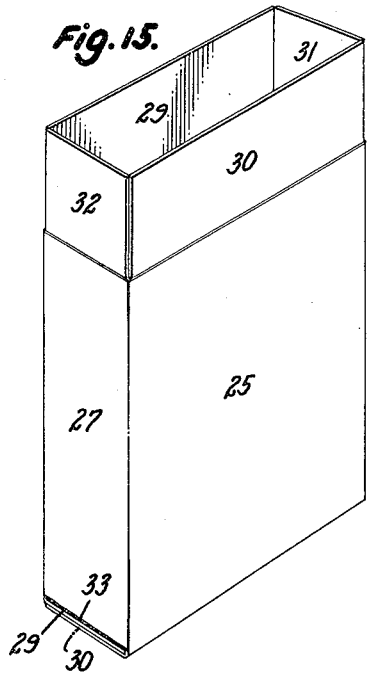
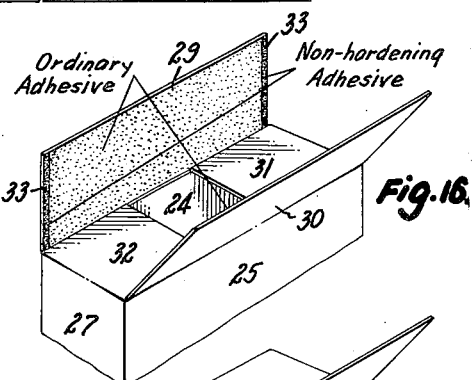
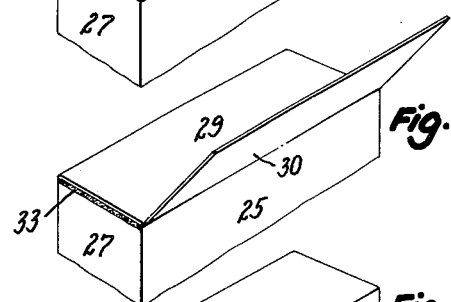
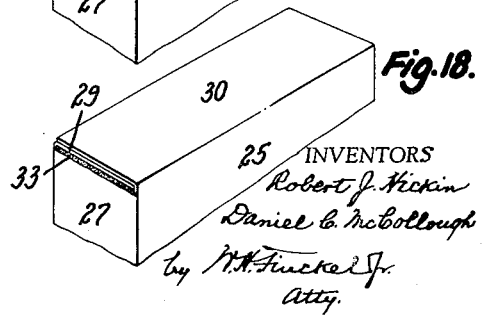

3,007,376
METHOD OF JOINING PAPERBOARD ELEMENTS USING MORE THAN ONE KIND OF ADHESIVE AND CARTON SEALED BY SUCH METHOD
Robert J. Hickin, Seville, and Daniel C. McCollough, Wadsworth, Ohio, assignors to Packaging Corporation of America, a corporation of Delaware
Filed July 30, 1958, Ser. No. 752,021
12 Claims. (Cl. 93—36)

This invention relates to a method of affixing surfaces of paperboard together using more than one kind of adhesive, and it has particular reference to the application of this method in the production of a sift-proof and infestation-proof closure for the end closing flaps of paperboard cartons.

In the packaging of pulverulent, granular, and flaky materials in paperboard cartons it has heretofore been a problem to so effectively seal the cartons that the contents will not escape, by sifting through voids in the carton closures, during handling and shipment, and that infestation will not occur due to the entrance into the cartons of insects through such voids, the prevention of this latter being of primary importance in the packaging of foodstuffs.

Various expedients have been resorted to in an effort to overcome these problems of sifting and infestation but they have had only a modicum of success. For example, over-wraps have been provided for the sealed cartons, and sealed bags or wrappers containing the packed commodity have been enclosed within the sealed cartons, and also the sealed cartons have been provided with an exterior coating of paraffin or other impervious coating material. All of these expedients add materially to packaging costs and are, unless mandatory, avoided by the packager. Furthermore, over-wraps, and paraffin or other exterior coatings, tend to obscure, and detract from the appearance of, the printed displays customarily applied directly to the carton exteriors, except, of course, where a printed over-wrap is used, but such a printed over-wrap when carelessly torn off will expose the relatively unsightly and unattractive blank carton walls and defeat the packager's advertising intent.

The prior art, in patents, publications, and the experience of carton manufacturers and users, shows that continuing effort has been made to solve the problem of sifting and infestation while still effecting economies in packaging practices, and one approach which appears to have had the greatest merit is an over-wrap of transparent, heat-sealable material, such as plastic film applied to the decorated carton. But although this type of over-wrap is fairly effective to prevent exterior sifting of the carton contents, sifting generally does occur within the confines of the over-wrap and the printed displays are thus obscured to an unsightly extent until the over-wrap is removed. The effectiveness of such an over-wrap to prevent infestation is, moreover, questionable.

Thus, if packagers can be provided with properly sift-proof and infestation-proof cartons of any of a variety of known, simple closure flap-sealed types, without over-wrap, enclosed sealed bags or wrappers, or exterior sealing coatings, each of which has disadvantages in both the cost and packaging-simplicity aspects, a marked advance will obviously be attained in the packaging art with savings to the packager in the cost of the cartons, the packaging machinery and the packaging procedure.

This end has been attained by the practice of the present invention and tests of packages sealed in accordance with the invention more drastic in the nature of their simulated conditions than any to which packages would be subjected in ordinary commercial use have shown that this is the case.

The invention comprises, in a relatively specific sense, a method of sealing the closure flaps of paperboard cartons, and the packages of the cartons thus sealed, in which a normally permanently setting adhesive of any of the known natural and synthetic types ordinarily used in the carton industry is employed for securing the flaps in inseparable, juxtaposed union to close the cartons and such closure is rendered sift-proof and infestation-proof by the application in those areas of the flap closure which might contain voids through which the contents could sift or insects could penetrate, of a non-hardening plastic, or plasticizable, material preferably compatible with the ordinary permanently setting adhesive used and which is normally of such a nature, or may be treated to condition it to such a nature, as to retain its plasticity, while being nevertheless non-flowing, under all predetermined atmospheric conditions, especially as respects temperature fluctuations, to which the sealed cartons may normally be subjected, such for example as would occur in a relatively hot shipping or storage space, as in a transport vehicle or warehouse, and in a freezing compartment, all as will be explained hereinafter more fully and finally claimed.

In the accompanying drawings illustrating the invention, in the several figures of which like parts are similarly designated:

FIG. 1 is a plan view of the paperboard blank from which a carton of a preferred type for the practice of the invention may be erected, FIG. 2 is a perspective view of a carton made from the blank of FIG. 1 and erected to conventional rectangular form with the closure flaps at one end partially sealed and those at the opposite end open, FIGS. 3 and 4 are fragmentary perspective views, FIG. 5 is a fragmentary side elevational view, and FIG. 6 is a further fragmentary perspective view, of the carton of FIG. 2 illustrating a preferred manner of application of the sealing practice of the invention to one set of end closure flaps, FIGS. 7, 8 and 9 are views similar to FIGS. 3, 4 and 6 but illustrating an alternative manner of application of the sealing practice of the invention, FIG. 10 is a schematic fragmentary view of apparatus suitable for carrying out the practice of the invention as illustrated particularly in FIGS. 3 to 6, FIG. 10a is an enlarged schematic view showing, in more detail, suitable mechanism for application of the non-hardening adhesive during the sealing operation, FIGS. 11, 12 and 13 are views similar to FIGS. 3, 4 and 6 but showing a different sequence in the closing of the end flaps of the carton, FIG. 14 is a view similar to FIG. 1 but showing the blank of another style of conventional carton, namely a common "seal-end carton" which is another of many types which lend themselves to the sealing practice of the invention, FIG. 15 is a view similar to FIG. 2, but having reference to the carton of the blank of FIG. 14, and FIGS. 16, 17 and 18 are views similar to FIGS. 7, 8 and 9 but related to the carton of FIG. 15.

Having reference to FIG. 1, it will be seen that the paperboard blank comprises, seriatim, a narrow side wall 1, a broad side wall 2, a narrow side wall 3, a broad side wall 4 and a glue flap 5 which, when attached to the narrow side wall 1 upon customary folding of the blank, will secure the parts for erection to ordinary rectangular form, FIG. 2.

As shown, the narrow side walls 1 and 3 are provided with short end closure flaps 6, and the broad side walls 2 and 4 are provided with broad end closure flaps 7 and 8, respectively. The ends of the broad end closure flaps 7 are provided with so-called Van Buren ears 9 cut from the material of the short end closure flaps 6. All of these elements of the blank are conventional for cartons of this type and are relatively foldable upon conventional folding scores indicated by the light parallel lines.

Having reference to FIGS. 3 to 6, 10 and 10a, the preferred practice of the invention in sealing the end flaps 6, 7, 8 and 9 of cartons formed from blanks of the type shown in FIG. 1 is substantially as follows, it being understood that, as illustrated in FIG. 10, the flaps 7, 8 and 9 at one end (the lower end, as shown) of each of the cartons have already been supplied with ordinary adhesive and closed, such ordinary adhesive having been applied to these flaps, and the flaps closed, by ordinary glue mechanism and flap folders of the type next to be described in regard to the flaps at the opposite ends of the cartons. It will be understood that the ordinary adhesive used in this flap affixing operation is of such a nature that it retains its adhesive property for a time sufficient to accommodate all of the flap closing and sealing operations, such time being relatively short due to the rapidity of operation of the more or less conventional apparatus employed for the preliminary flap affixing operations and of the special apparatus employed for application of the non-hardening adhesive, it being apparent that the travel of the cartons, whether continuous or step-by-step, can be rather rapid.

Complete apparatus for the practice of the invention is disclosed in the copending application of Gerald H. Steele and Robert J. Hickin for patent for Carton Sealing Apparatus, filed November 24, 1959, Serial No. 855,074, which was abandoned in favor of a continuation-in-part application of the same inventors and with the same title of invention, filed December 1, 1960, Serial No. 73,147.

The sequence of flap sealing steps, and the instrumentalities for applying the non-hardening adhesive, as shown in the apparatus of the said copending application of Steele and Hickin are slightly different from those disclosed herein with reference to FIGS. 10 and 10a, but the ultimate sealing effect is similar.

Thus, as shown in FIG. 10, it will be seen that as the filled cartons travel with the conveyor 10, which may be either of the chain or belt type provided with feed lugs, and are preferably supported and directed in their travel by guides 11 which contact their broad side walls 2 and 4, their short end closure flaps 6 will be folded in and their broad end closure flaps 7 and 8, the former with the ears 9 in their planes, folded out, all by conventional mechanisms (not shown), and these flaps will be passed under the adhesive applicator rolls 12 of conventional glue mechanisms so that the ordinary adhesive (shown by stipling) is applied to their ultimate inner faces and to the inner faces of the ears 9.

Then by the operation of conventional flap closing means (not shown) the flaps 7 will be closed in and down upon the flaps 6 and the flaps 8 closed in and down upon the flaps 7, as shown at a and b, respectively, and the cartons will be successively discharged by the conveyor 10 onto a conveyor 13 which travels at right angles thereto.

As the cartons travel with the conveyor 13 positioned by guides 14 which engage their narrow side walls 1 and 3 the ears 9 of the flaps 7 at both the tops and bottoms of the cartons will be bent outwardly by ploughs or other appropriate means (not shown) so as to produce obtuse angles between the ears 9 and their adjacent narrow side walls 1 and 3, as best shown in broken lines FIG. 4, and in full lines FIG. 5, to provide in the included angles thus formed, and in the zones of their apexes, notches to receive strips or beads 15 (FIG. 5) of the non-hardening adhesive.

This non-hardening adhesive may preferably be thus applied by the mechanism indicated at c, FIG. 10, and shown schematically in more detail in FIG. 10a, including discs 16 rotating on vertical axes 17 and having relatively narrow, or blade-like, peripheries 18 which are in horizontal alignment with the apexes of the included angles between the ears 9 and their adjacent narrow side walls 1 and 3. The non-hardening adhesive is forced under pressure, and, when necessary, heated to its flowable temperature which is in excess of any temperature to which the ultimately sealed cartons would normally be subjected, as by a pump 19, to small orifice nozzles 20 which deposit it in a bead or layer 21 upon the periphery 18 of each of the applicator discs 16 as they rotate, and doctor blades 22, preferably of U-shape and adjustable radially of the discs serve to doctor the layer of adhesive to that predetermined as appropriate for the particular seal required. Thus, as the doctored layers of adhesive are brought by the peripheries of the rotating discs into engagement with the angles between the ears 9 and narrow side walls 1 and 3 of the travelling cartons, the affinity of the paperboard of the cartons for the adhesive, which is greater than that of the peripheries of the discs, will cause the beads or layers of adhesive to be transferred from the discs to the carton parts contacted.

Just subsequent to this application of the strips or beads 15 (FIG. 5) of non-hardening adhesive the ears 9 will be folded flat against their adjacent narrow side walls 1 and 3 by conventional means (not shown) and such folding will result in the strips or beads of the adhesive, which is still in flowable condition, being forced to flow into all voids which may be present in the flap-closed ends of the cartons and particularly at the corners of the carton ends where the voids are most likely to occur.

Thereafter the cartons travel through a tunnel formed by the usual arrangement of pressure belts d and of a length adequate to hold the closure flaps and ears of the end seals under pressure sufficient, and long enough sustained, to insure their proper adhesion. The ears 9 will serve to cover and conceal any possible unsightly spreading of the non-hardening adhesive.

Obviously, if it is desired to vary the sequence of folding of the broad closure flaps 7 and 8, as indicated in FIGS. 11 to 13, the same type of apparatus as that disclosed in FIGS. 10 and 10a may be employed, save only that the means for folding the flaps 7 and 8 will function in reverse sequence.

In the closing and sealing of the ends of a carton of the type having Van Buren ears 9 according to the practice disclosed in FIGS. 7 to 9, it will be seen that ordinary permanently setting adhesive is applied to the inner faces of the broad end closure flaps 7 and their ears 9, and to the inner faces of the broad end closure flaps 8, and that the non-hardening plastic sealing material instead of being applied after the end flaps have been closed down will be applied, preferably, though not necessarily, by special glue mechanism, simultaneously with application of the ordinary adhesive, in beads or strips 23, as shown, in areas which more or less closely follow the folding scores between the broad end closure flaps 7 and the ears 9.

Thus, when the short end closure flaps are folded in, FIG. 7, and the broad end closure flaps 7 and 8 are folded over in juxtaposition to them and to each other, in the order named, and the ears 9 are folded against the narrow side walls 1 and 3, as shown in FIG. 9, the ordinary adhesive carried by the broad flaps 7 and 8 and the ears 9 will effect permanent, fixed adhesion of these parts. Also, inasmuch as the non-hardening adhesive is disposed in the critical area of the end closure, it will, under sealing pressure, flow into and serve to seal any possible voids, particularly such as may be present, as previously indicated, at the corners of the carton ends. Of course, here also the ears 9 will serve to cover and obscure any unsightly spreading of the non-hardening adhesive at the end edges of the narrow side walls 1 and 3.

Although cartons of the type shown in FIGS. 1 to 13 are preferably for use in the practice of the invention, as has been indicated hereinbefore, this preference being due to the provision of the Van Buren ears 9 and the part they play in furnishing an effective and sightly seal, it is conceivable that other styles of cartons may be accommodated to the invention, and one such is represented by the conventional seal-end carton illustrated in FIGS. 14 to 18.

The conventional seal-end carton is made from a paperboard blank (FIG. 14) comprising the broad side walls 24 and 25 and narrow side walls 26 and 27 joined in tube form by a glue flap 28, the broad and narrow side walls 24, 25 and 26, 27 having their opposite ends provided with end closure flaps 29, 30, 31 and 32, respectively, all of these parts being relatively foldable upon folding scores indicated by the light parallel lines.

In the practice of the invention as applied to this type of carton, no matter which of the broad end closure flaps 29 and 30 is first folded down after the ordinary adhesive has been applied to them, the non-hardening sealing adhesive may be applied at the joints between the end edges of the flaps 29 or 30 and the fold lines of the short flaps 31 and 32 by means such as those shown in FIGS. 10 and 10a, preferably prior to the application of sealing pressure to the flaps so that the non-hardening adhesive will have an opportunity to enter the joined edges and fold lines of these flaps and will, upon subsequent application of sealing pressure, be forced to flow into possible voids.

Alternatively, assuming, as shown in FIGS. 16 to 18, that the broad end closure flap 29 is folded in and down prior to folding of the other broad end closure flap 30, the inner face of this first-folded flap 29 will carry not only the ordinary adhesive but may have the non-hardening sealing material applied in strips or beads 33 in areas adjacent to its edges, and the other broad end closure flap 30 will carry on its inner face only the ordinary adhesive (see FIG. 16). Obviously, if the flap 30 is to be first closed it will carry both types of adhesive similarly applied.

Thus, when the several end closure flaps are folded and secured in end-sealing condition, as shown in FIGS. 16 to 18, the ordinary adhesive will serve to secure the first-folded broad flap 29 to the short end closure flaps 31 and 32 and the other broad flap 30 to the first-folded flap 29, and the already applied non-hardening adhesive will be caused to flow into any voids and thus effect the desired seal.

It should be noted, also, that the closure flaps may be folded down in any desired sequence which will best serve the packaging requirements in a particular case. For example, in FIGS. 3 to 6 the flaps are folded in the sequence 6—7—8, whereas in FIGS. 11 to 13 they are folded in the sequence 6—8—7. They might, if desired, be folded in either the sequence 7—6—8 or 8—6—7. The sequence is not ordinarily vital to effective practice of the invention so long as it provides accommodations for application of the non-hardening sealing material. The same is true in respect to cartons of other types as, for example, the seal-end carton of FIGS. 14 to 18.

In reference, therefore, to any type of carton closure with which the practice of the invention is employed it will be apparent that the ordinary adhesive serves to maintain the closure flaps in proper, desired, inseparable, juxtaposed closed condition, and that the non-hardening sealing material, being applied at the critical junction of the flaps, will act in the nature of a caulking compound which, through the retention of its desired, adequate plasticity, will serve to maintain its seal of possible voids, particularly at the corners of the carton ends, and will act as a barrier against sifting and infestation, while at the same time, under conditions of temperature and the like to which the carton may normally be subjected, being non-flowing and hence capable of remaining in its desired location.

In the foregoing reference has been made broadly to organic and inorganic adhesives, and natural and synthetic adhesives, as proper for use according to the invention as the ordinary adhesives for permanent securement of the closure flaps of the cartons.

As examples of such adhesives which are considered to be appropriate for use in accordance with the invention, and the properties of which are known in the packaging industry, attention is directed to those in the following list.

(A) Vegetable adhesives, for example:
 1. Protein adhesive.
 2. Dextrine adhesive.
(B) Animal adhesives, for example:
 1. Animal glues.
 2. Casein adhesive.
(C) Latex adhesives, for example:
 Acetate adhesive.
(D) Inorganic adhesives, for example:
 Silicate adhesive.
(E) Lacquer adhesives, for example:
 Cellulose nitrate adhesive.
(F) Hot melt adhesives, for example:
 Ethyl cellulose.
(G) Resin adhesives.

For use as the non-hardening sealing or caulking material, various natural and synthetic waxes, gums and resins are available, and these may be appropriately modified to give them the predetermined desired characteristics of plasticity retention under various, or varying, atmospheric conditions, including particularly temperature changes, by the addition of plasticizers of various kinds.

As examples of sealing or caulking materials suitable for use in the practice of the invention, and modifiers or plasticizers which may be incorporated with them, attention is directed to the following list.

(A) Microcrystalline wax or any plastic or thermoplastic material having properties similar to those of microcrystalline wax.

(B) Microcrystalline wax or other plastic or thermoplastic material as in A, in combination with a plasticity modifier such as:
1. Butyl rubber.
2. Natural rubber.
3. Cyclized rubber.
4. Rubber hydrochloride.
5. Polyethylene.
6. Polyisobutylene.
7. Resinous modifiers.
8. Any modifier which enhances the plasticity of the base material.

In the selection of the ordinary adhesive and non-hardening adhesive to be used together in the sealing practice of the invention it must be borne in mind that the two adhesives thus selected must be compatible inasmuch as the non-hardening adhesive is applied, at least in part, to surfaces of elements which already carry the ordinary adhesive.

In an actual run of test samples the ordinary adhesive used was a resin emulsion, and the non-hardening sealing or caulking material was microcrystalline wax modified with 2 percent of butyl rubber to obtain the desired plasticity of such wax.

The cartons closed with this combination of ordinary adhesive and non-hardening sealing or caulking material as the securing substances were found effective to fully counteract both sifting and infestation in the range of temperatures between 0° F. and 140° F., with the seal unimpaired at the conclusion of the test.

Experimentation has demonstrated, moreover, that the wax, gum or resin used as the non-hardening or caulking material may be so modified by addition of various percentages of a chosen plasticizer or plasticizers, as to adjust its plasticity for accommodation to a greater temperature range, a range of temperatures between −40° F. and 160° F., and even lower and higher, being envisioned, therefore, as capable of being effectively met.

In a comparative laboratory test conducted upon cartons containing non-fat powdered milk, dog meal, and corn meal, all of which products are ordinarily subject to infestation, in four classes of carton packages, namely (1) cartons with overwrap, (2) cartons with Van Buren ears sealed with ordinary adhesive, (3) cartons machine sealed in accordance with the invention, and (4) cartons hand sealed in accordance with the invention, in order to determine the effectiveness of the seal of the invention, the following procedure was followed.

The contents of the cartons were screened and samples microscopically examined for insects, and insect larvae and eggs, and were then fumigated so that any contained insects, insect larvae and eggs would be dead when the cartons were filled and sealed.

Then, using fibre drums to receive them, the filled and sealed cartons, with their contents freed of live insects, insect larvae and eggs by the aforesaid inspection and fumigation procedure, were isolated by product in such drums, twelve cartons to the drum, and each drum provided with a moisture supply and approximately three hundred healthy adult insects of the crawling variety (Tribolium and Saw-Toothed Grain Beetle) which have a life cycle of approximately thirty days.

Duration of the test to which the cartons were thus subjected was approximately four and one-half months, specifically from the 23rd of July through the 5th of November, one hundred and six days. In the opinion of experts in infestation control in the packaging field this test simulated a package shelf life which would run into years and to which packages would rarely, if ever, be subjected.

At the completion of the test an examination of the cartons gave the following information.

Three out of twelve overwrapped cartons (class 1) inspected were infested, although the number of insects found were few. One overwrapped carton, however, contained larvae which indicated insect penetration early in the test.

Eight out of the twelve cartons sealed with ordinary adhesive (class 2) in the usual manner were found to be severely infested. In one package, for example, there were at least 2,000 adult insects.

Out of twelve cartons machine sealed in accordance with the invention (class 3) eleven were completely free of infestation. One carton inspected on the 106th day contained a single insect (no larvae).

No insects were found in the twelve cartons hand sealed (class 4) in accordance with the invention.

The seals on the cartons which were machine sealed in accordance with the invention were found upon inspection prior to the test not to be very good. This was attributed to the fact that it was not practical to make fully effective adjustments in the machine sealing equipment for so short a test run. The above referred to single failure in this group can therefore reasonably be charged to an imperfect seal.

Hence it can properly be concluded that the carton with Van Buren ears machine sealed in accordance with the invention under normal production conditions of properly adjusted and effectively functioning sealing equipment is virtually impervious to infestation. It is also superior to an overwrapped carton in its function as a barrier to crawling insects. It is also a sift-proof carton.

As a result of this test it appears obvious that the invention makes possible the sealing of cartons against sifting, and again infestation from exterior sources, to an extent not heretofore possible with practices now known and accepted in the industry.

Moreover, the thus sealed package may be produced more cheaply than those of pseudo infestation-proof and sift-proof types now known, not only for the reason that the carton itself is cheaper inasmuch as it requires no overwrap, enclosed bag, exterior coating or the like, being self-sufficient, but for the further reason that it may be set up, filled and closed, with the ordinary adhesive and non-hardening sealing or caulking material applied to it, upon known types of packaging machinery embodying such modifications only as are necessary for proper application of the sealing or caulking material.

Furthermore, it will be noted that the carton closing and sealing mechanism may be of more or less accepted, standard, types except for the mechanism by which the layer or bead of the non-hardening adhesive is applied. Also, the fact that the non-hardening adhesive is pumpable when furnished for application by the applicator means $c$ (FIGS. 10 and 10$a$) makes possible its easy and efficient use in the disclosed line production of the sealed cartons.

Also, the sealing practice of the invention is relatively so easy, and requires for its performance such simple mechanisms, which are in the main of familiar types, that it will tend to greatly reduce packaging costs in this field as compared with present ineffective practices which are, in themselves, complicated and require expensive and space consuming machinery for their performance.

It is conceivable that the ordinary adhesive may be intentionally or inadvertently omitted from certain of the closure flaps without defeating the purpose of the sealing practice of the invention. For example, in cartons of the types illustrated in the drawings omission of the ordinary adhesive from the inner face of the broad closure flap (7, FIGS. 3 and 7; 8, FIG. 11; or 29, FIG. 16) which is folded into contact with the short closure flaps (6 or 31 and 32, respectively) will not result in an imperfect seal, or a seal which is not sift-proof and infestation-proof, for the reason that the presence of the non-hardening adhesive will serve not only to fill possible voids but also to adhesively secure the flaps. This is true, moreover, in respect to the sealing of cartons of various types other than those illustrated and, further, in cases where the sequence of flap closure is different from the sequences illustrated, as hereinbefore described. Also, should the ordinary adhesive be omitted from the Van Buren ears 9 an effective seal and also proper securement of these ears would be effected by the flowing of the non-hardening adhesive when sealing pressure is applied to the ears. However, from the standpoint of practical application of the sealing practice of the invention it is preferred that the ordinary adhesive and the non-hardening adhesive be applied as has been described, it being possible thereby to employ machines and mechanisms generally of familiar types and modes of operation.

Various changes and modifications are considered to be within the principle of the invention and the scope of the following claims.

What we claim is:

1. The method of sealing a paperboard carton having angularly disposed side walls and closure flaps foldably connected to said side walls and adapted, when in folded relation, to form an end wall angularly disposed to said side walls; said method comprising applying to mating surfaces of predetermined flaps a permanently setting adhesive to effect retention of said flaps in end wall-forming relation, and applying a plastic sealing material to marginal portions of said predetermined flaps, each marginal portion to which such sealing material is applied forming a part of the end wall periphery which extends from the line of fold of one predetermined flap to the line of fold of a second predetermined flap, the plastic sealing material having the property of retaining its plasticity in the presence of all atmospheric conditions to which the sealed carton may normally be subjected; the plastic sealing material, in the presence of applied pressure and the coaction of the closure flaps and side walls, being caused to flow relative to the predetermined flap marginal portions and completely fill any voids formed at the juncture of the carton end wall and side walls.

2. The method recited in claim 1, in which the permanently setting adhesive and the sealing material are compatible and the latter is applied at least in part to surfaces bearing the former.

3. The method recited in claim 1, in which the plastic sealing material is a wax having the predetermined desired characteristics of plasticity retention.

4. The method recited in claim 1, in which the permanently setting adhesive may be any of those normally used for affixing carton flaps and selected from the known groups of adhesives of organic and inorganic origin, and the plastic sealing material is of thermoplastic type preferably combined with a modifier which serves to impart to it the desired plasticity under predetermined atmospheric conditions to which the sealed carton may be subjected.

5. The method recited in claim 4, in which the plastic sealing material is a wax, and the modifier is a plasticizer of the types of natural and synthetic rubber.

6. The method recited in claim 5, in which the wax is a microcrystalline wax, and the modifier is butyl rubber in an amount sufficient to maintain a desired non-flowing plasticity of the wax in a temperature range of the order of —40° F. to 160° F.

7. The method recited in claim 4, in which the plastic sealing material is a wax, and the modifier is a plasticizer of the types of natural and synthetic resins.

8. The method recited in claim 1 wherein the plastic sealing material is applied in the form of a continuous bead extending the full length of each marginal portion.

9. The method of sealing a paperboard carton having angularly disposed side walls, closure flaps foldably connected to said side walls and adapted, when in folded relation, to form an end wall angularly disposed to said side walls, and an ear connected to a marginal portion of one of said closure flaps and foldable relative thereto along a fold line angularly disposed with respect to the fold line connection between said one flap and a side wall; said method comprising applying to mating surfaces of predetermined closure flaps, including said one closure flap, a permanently setting adhesive to effect retention of said closure flaps in end wall-forming relation, applying a plastic sealing material along the line of fold between said one flap and said ear, the plastic sealing material having the property of retaining its plasticity in the presence of all atmospheric conditions to which the sealed carton may normally be subjected, and applying pressure to the plastic sealing material by folding said ear against the adjacent side wall whereby said closure flaps and said adjacent side wall will coact to effect flow of said sealing material relative to said one flap and completely fill any voids formed at the juncture of the carton end wall and said adjacent side wall.

10. The method recited in claim 9, in which said ear is bent outwardly away from said adjacent side wall to provide between said ear and said side wall at said line of fold an obtuse angle prior to and during application of the plastic sealing material along said line of fold.

11. The method recited in claim 9 wherein the ear is adhesively retained in folded relation against said adjacent side wall.

12. The method recited in claim 9 wherein the plastic sealing material is applied subsequent to said closure flaps assuming an end wall-forming relation.

References Cited in the file of this patent

UNITED STATES PATENTS

| | | |
|---|---|---|
| 1,974,256 | Bergstein | Sept. 18, 1934 |
| 2,341,845 | Mark et al. | Feb. 15, 1944 |
| 2,501,852 | Ringler | Mar. 28, 1950 |
| 2,523,488 | Williamson | Sept. 26, 1950 |
| 2,772,610 | Arneson | Dec. 4, 1956 |
| 2,783,692 | Bolding | Mar. 5, 1957 |